(12) United States Patent
Biggs et al.

(10) Patent No.: US 7,401,637 B2
(45) Date of Patent: Jul. 22, 2008

(54) PRESSURE-ONLY MOLTEN METAL VALVING APPARATUS AND METHOD

(75) Inventors: Glen N. Biggs, Wappingers Falls, NY (US); John J. Garant, Poughkeepsie, NY (US); Peter A. Gruber, Mohegan Lake, NY (US); Bouwe W. Leenstra, Walden, NY (US); Christopher L. Tessler, Poughquag, NY (US); Thomas Weiss, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 11/495,966

(22) Filed: Jul. 28, 2006

(65) Prior Publication Data

US 2008/0023526 A1 Jan. 31, 2008

(51) Int. Cl.
*B22D 18/00* (2006.01)

(52) U.S. Cl. .......................... 164/119; 164/306; 228/33

(58) Field of Classification Search ................. 164/119, 164/306; 228/102, 33
See application file for complete search history.

(56) References Cited

U.S. PATENT DOCUMENTS

| 5,244,143 | A | | 9/1993 | Ference et al. ............... 228/180 |
| 5,364,011 | A | * | 11/1994 | Baker et al. ............ 228/180.21 |
| 6,527,158 | B1 | | 3/2003 | Brouillette et al. ............ 228/33 |
| 7,131,565 | B2 | * | 11/2006 | Gruber et al. ................... 228/8 |

* cited by examiner

*Primary Examiner*—Jonathan Johnson
*Assistant Examiner*—I. H. Lin
(74) *Attorney, Agent, or Firm*—Ohlandt, Greeley, Ruggiero & Perle, L.L.P.; Daniel P. Morris, Esq.

(57) ABSTRACT

A new pressure-only molten metal valving apparatus and method is provided. This novel approach to controlling the flow of liquids eliminates the need for active, moving valve components. Using the natural surface tension properties of liquids, the gas pressure either activates liquid flow when a threshold is overcome or retains the liquid in a head, even when lifted.

20 Claims, 4 Drawing Sheets

PRESSURE-ONLY MOLTEN METAL VALVING APPARATUS AND METHOD

FIELD OF THE INVENTION

The present invention relates to an apparatus and method for dispensing a molten alloy into cavities of a substrate, such as, an electronic substrate. More particularly, the present invention relates to a method of dispensing molten solder into mold plate cavities, i.e., into the substrate cavities. The method allows lifting of the head containing molten alloy without leaking the alloy from the head.

BACKGROUND OF THE INVENTION

Solder processing is known in the art and is exemplified in U.S. Pat. No. 5,244,143 to Ference, et al., entitled "Apparatus and Method for Injection Molding Solder and Applications Thereof" and U.S. Pat. No. 6,527,158 to Brouillette, et al., entitled "Method and Apparatus for Forming Solder Bumps."

C4NP is a new solder technology in the IMS family of solder processing. C4NP is IMS applied to wafer bumping. C4NP uses a solder dispense head under which molds are scanned to fill cavities therein with solder. To date, the prevailing solder dispensing mechanism has been a slot filled with molten solder that is injected into the mold cavities, which are the substrate cavities, under pressure.

This solder dispense mechanism provides for solder filling of individual mold plates, but is not amenable to manufacturing. The reasons for this are as follows:

(1) Since there is always a large volume of solder in the slot in contact with the mold plate, this solder must be contained after the fill is complete or it will spill out. Complex mechanical fixtures called "parking blades" are used that the head travels onto, parks, and then travels off of onto the next mold plate, i.e., substrate, cavities to be filled. With the foregoing required operations, there are several points where solder can leak out of the head which is not desirable for manufacturing; and (2) The currently prevailing head configuration employs O-rings that can easily be damaged during these operations, thus requiring rework steps which severely limits the fill cycles.

These O-rings also typically have high friction against the mold plates and frequently causes O-ring instabilities in their O-ring grooves. Accordingly, there is an unmet need for a system that eliminates the present solder slot design described herein above and also eliminates the need for using sensitive, high friction O-rings. Such improvements and changes in design are essential if C4NP is to become a successful manufacturing technology.

SUMMARY OF THE INVENTION

In broad concept, the present invention provides a new solder delivery system that replaces a large solder slot at the bottom of the head with a linear micro hole array.

Accordingly, the present invention provides an apparatus for dispensing a molten alloy into cavities of a substrate, including:

a micro-hole feed head having a micro-hole feed plate at the bottom of the micro-hole feed head containing an array of small holes through which molten alloy is supplied under pressure into cavities in a substrate;

a reservoir connected to the micro-hole feed head for holding the molten alloy, wherein the micro-holes have a diameter from about 10 microns to about 100 microns and an aspect ratio of at least about 2;

means for heating the reservoir for maintaining the alloy in a molten state; and means for supplying the molten alloy from the reservoir to the micro-hole feed plate through a manifold structure in the micro-hole feed head; and means for supplying a gas at pressure to the micro-hole feed head such that when the gas pressure is applied, the molten alloy in the reservoir is pushed towards the micro-hole feed plate at the bottom of the micro-hole feed head through the manifold structure thereby dispensing molten alloys into cavities of the substrate.

The present invention also provides an apparatus for dispensing a molten solder into cavities of a substrate, including:

a micro-hole feed solder head having a micro-hole feed plate at the bottom of the solder head containing an array of small holes through which solder is supplied under pressure into cavities in a substrate;

a solder reservoir connected to the micro-hole feed solder head for holding the solder, wherein the micro-holes have a diameter from about 10 microns to about 100 microns and an aspect ratio of at least about 2;

means for heating the reservoir for maintaining the solder in a molten state; and means for supplying the solder from the reservoir to the micro-hole feed plate through a manifold structure in the micro-hole solder head; and means for supplying a gas at pressure to the solder head such that when the gas pressure is applied, the molten solder in the reservoir is pushed towards the micro-hole feed plate at the bottom of the solder head through the manifold structure thereby dispensing molten solder into cavities of the substrate.

The present invention further provides a method of dispensing a molten alloy into cavities of a substrate. The method includes the steps of:

introducing an alloy into a solder reservoir connected to a micro-hole feed head for holding molten alloy, wherein the micro-holes have a diameter from about 10 microns to about 100 microns and an aspect ratio of at least about 2;

heating the reservoir to produce a molten alloy;

providing a gas under pressure through a valve with an "on" and an "off" setting into the reservoir to feed the molten alloy under pressure into the micro-hole feed head having a micro-hole feed plate containing an array of small holes to supply the molten alloy therethrough into the cavities of the substrate;

moving the valve to the "on" setting to pressurize the gas in the micro-hole feed head; and thereafter moving the valve to the "off" setting to not pressurize the gas in the micro-hole feed head;

such that when the valve setting is "on," gas pressure is applied, the molten alloy in the reservoir is pushed towards the micro-hole feed plate at the bottom of the solder head thereby dispensing molten alloy onto the substrate.

The present invention still further provides a method of dispensing a molten solder into cavities of a substrate, the method including the steps of:

introducing a solder into a reservoir connected to a micro-hole feed solder head for holding solder, wherein the micro-holes have a diameter from about 10 microns to about 100 microns and an aspect ratio of at least about 2;

heating the reservoir to produce a molten solder;

providing a gas under pressure through a valve with an "on" and an "off" setting into the reservoir to feed the molten solder under pressure into the micro-hole feed solder head having a micro-hole feed plate containing an array of small holes to supply the solder there through into the cavities of the substrate;

moving the valve to the "on" setting to pressurize the gas in the solder head; and thereafter moving the valve to the "off" setting to not pressurize the gas in the solder head;

such that when the valve setting is "on," gas pressure is applied, the molten solder in the reservoir is pushed towards the micro-hole feed plate at the bottom of the solder head thereby dispensing molten solder onto the substrate.

These and other aspects of the present invention will become apparent through the description of the preferred embodiments with reference to the drawings that follow.

DETAILED DESCRIPTION OF THE PREFERRED EMBODIMENTS

The present invention provides a new pressure-only molten metal valving apparatus and method. This novel approach to controlling the flow of liquids eliminates the need for active, moving valve components. Using the natural surface tension properties of liquids, the gas pressure either activates liquid flow when a threshold is overcome or retains the liquid in a head, even when lifted.

The micro holes are so small that molten solder under ambient pressure can not penetrate them and thus leak out of the head if it is lifted. At the end of each mold fill, the head can simply be lifted once the reservoir feed pressure is turned off.

Once a new mold is in place, the head is once again lowered onto this and the next mold fill scan begins. Thus, these micro holes and their specific dimensions act like a molten metal valving method which involves no moving parts whatsoever, with pressure being the only activating agent.

Further, this new head solder delivery system is composed of materials that have significantly lower friction coefficients thus providing reliable, stable scan properties required for a true manufacturing system.

The above novel "Pressure-Only Molten Metal Valving Method" has been reduced to practice and shows the ability both to lift the head containing molten solder as well as fill mold plate cavities, i.e., the substrate cavities, with solder as is required for a C4NP manufacturing fill tool.

Preferably, the mold plate is the substrate itself, which is typically an electronic substrate.

In practice, the substrate scans under the solder feed holes in a smooth motion to align successive rows of empty cavities to be filled with molten alloy. The micro-hole feed plate is preferably affixed against the substrate. The continuous solder supply available in a reservoir is either pressurized to initiate the solder feed, or not pressurized to contain the solder within the head when lifted. Thus, the molten metal head containing molten alloy is lifted and cavities filled with molten alloy without leaking the alloy.

The gas at pressure is non-oxidizing nitrogen.

Figure 1:
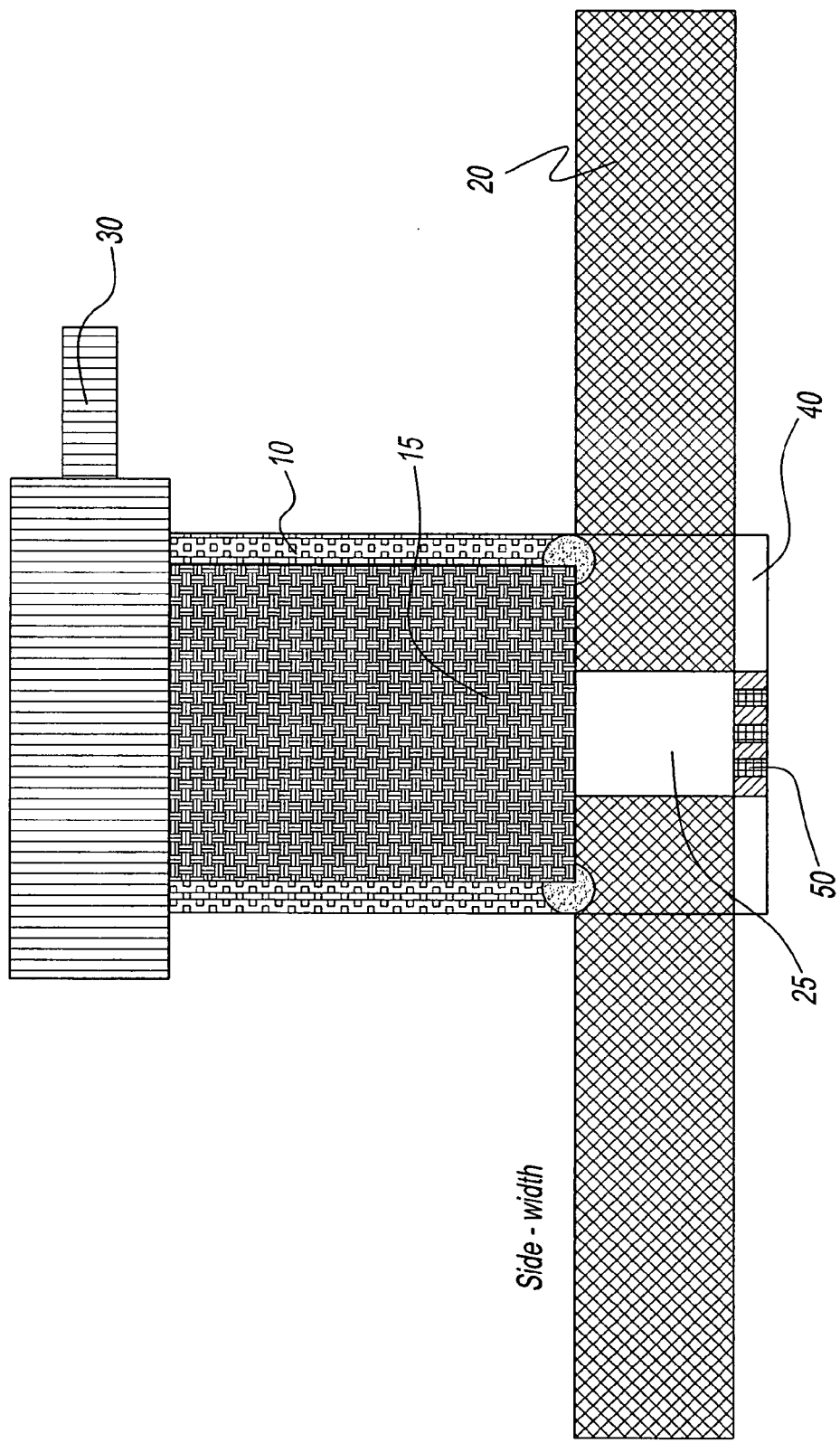
FIG. 1 is a side-width view of a molten alloys dispenser wherein micro-hole feed head replaces a large continuous solder slot with an array of small holes through which the solder feeds under pressure.

Referring to FIG. 1, the present micro-hole feed head replaces a large continuous solder slot with an array of small holes through which the solder feeds under pressure. These micro holes are contained in a material that has inherent low friction properties. Examples of such materials include teflon low friction materials for lower temperature use and polyimide low friction materials for higher temperature use. Thus, as the molds, i.e., substrates having cavities, scan under this material containing the solder feed holes, there is a smooth motion bringing successive rows of empty cavities that are filled with molten solder. However, depending on the materials used for the head, the present invention can supply various molten metals in a similar manner.

FIG. 1 shows a solder reservoir 10 connected to a micro-hole solder head 20 through O-ring seals and to a manifold 25, which is the means for supplying solder from the reservoir to the micro-hole feed plate through the manifold structure in the micro-hole solder head 20 in such a way that the solder 15 can flow between 10 and 20 under activating gas pressure 30, such as a non-oxidizing nitrogen supply. The reservoir 10 is heated with a means for heating that surrounds the reservoir 10, and includes means, such as, a heating element, a coil, or a circulating fluid, to maintain the metal alloy, i.e., the solder in this case, in a molten state. Thus, when gas pressure 30 is opened, the molten solder in reservoir 10 is pushed towards the micro-hole feed plate 40 containing an array of small holes or vias 50 at the bottom of solder head 20.

In normal operation, gas pressure 30 is only opened when micro-hole feed plate 40 is affixed against a mold plate, which is not shown in this figure.

Figure 2:
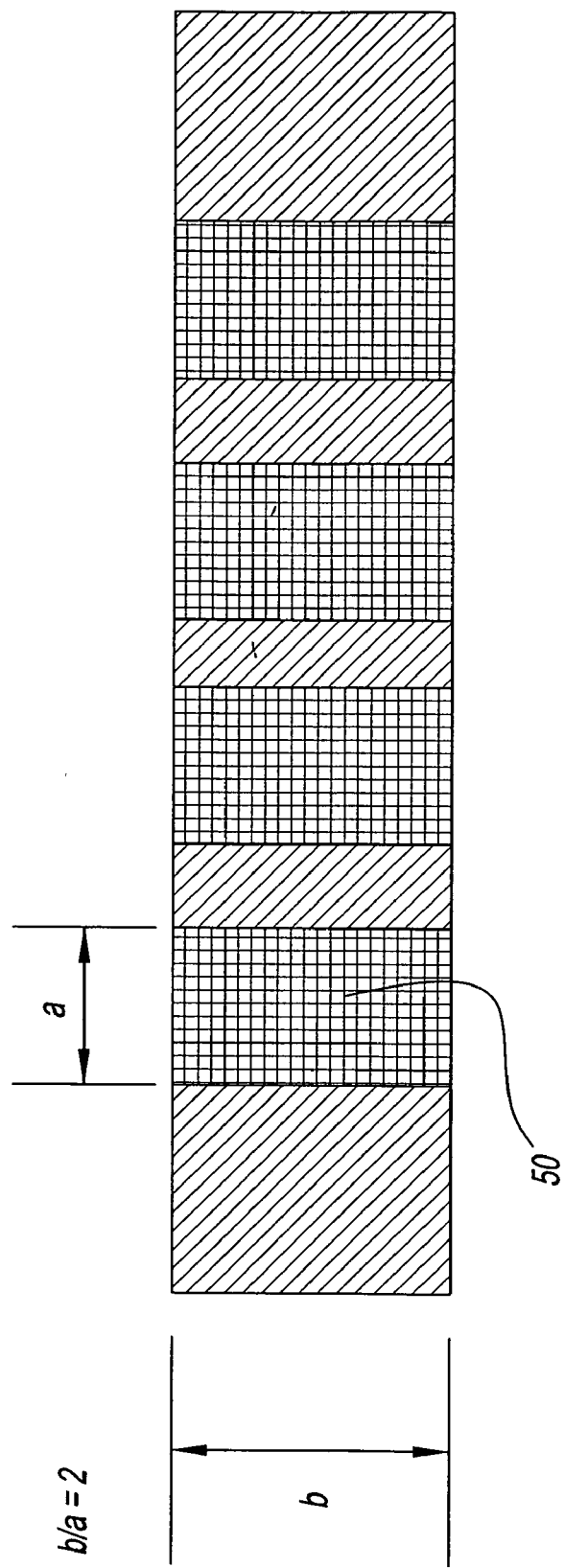
FIG. 2 shows the holes connecting the main solder reservoir supply with the mold plate typically have ratios of at least 2, depth "b" to width "a".

Referring to FIG. 2, the holes connecting the main solder reservoir supply with the mold plate are shown. They typically have aspect ratios of at least 2 or greater than 2, depth "b" to width "a" (depth or height to width, diameter). Typical dimensions for molten solder (SnPb eutectic or lead-free alloys) are b=150 microns and a=75 microns. At these dimensions and aspect ratios, the solder at ambient pressure will not penetrate the holes in a continuous fashion so as to leak out. This is a function of the solder surface tension and viscosity. However, with positive pressure above ambient, the solder will penetrate the holes and thus feed into cavities in the mold.

FIG. 2 shows the detailed cross-section of the micro-hole feed plate. The positive pressure above ambient forces the molten solder 15 to enter the vias 50 when activated by the gas pressure 30. Since these vias have absolute a and b dimensions typically in the range of 10 to 100 microns, the molten solder at ambient pressures will not readily penetrate vias with depth to width aspect ratios of 2 or more due to the surface tension of solder (0.5 J/M2). However, if the solder is pressurized above ambient, it eventually reaches an activation pressure above the surface tension defined limit and thereafter will penetrate the vias. Thus, pressure alone is the valving initiator, and is at least about 1 psi, but in this case it is from about 1 to about 2 psi, more preferably, from about 1 to about 20 psi.

Pressures below the threshold retain the solder within the head, and pressures above the threshold will cause the solder to penetrate through and out of the via holes. This pressure-only molten solder valving method is especially valuable when supplying molten metals that have properties, such as, high melting temperatures, that would make active valving difficult. Additionally, this pressure-only valving method provides the simplest means to achieve valving for molten metals, as well as other liquids, including water.

Many fluid delivery systems may require the fluids to minimize contact with potential contaminants, such as those found in active valving components. This invention eliminates all such while still providing control of fluid flow.

Preferred embodiment of the present invention is further described in FIGS. 3-6.

Figure 3:
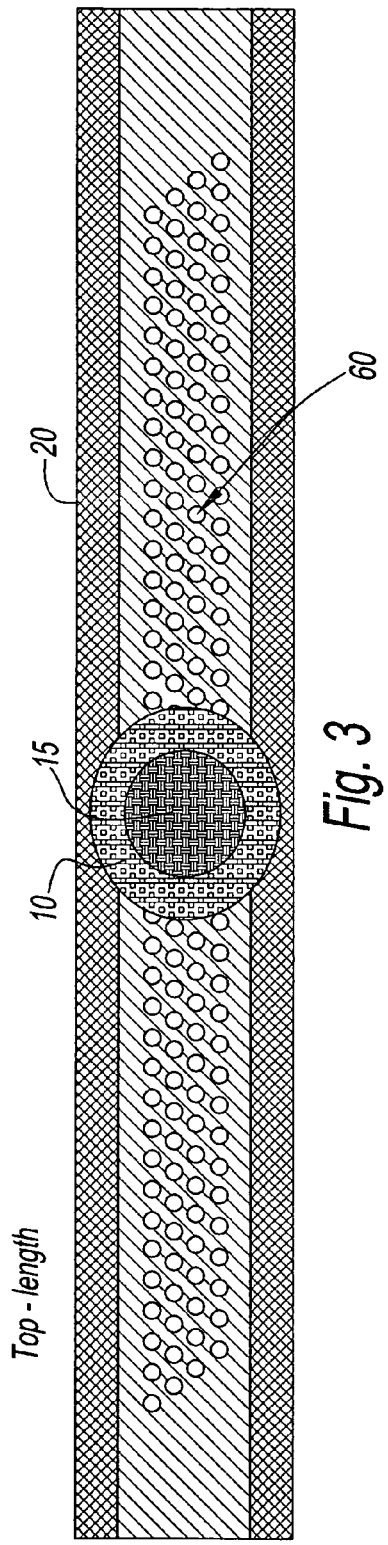
FIG. 3 is a top-length view of a linear array of the micro holes covering the entire width of the cavity area of the mold plate.

Referring to FIG. 3, a top view of a solder head containing molten solder 15 in the reservoir 10 attached to solder head 20 is shown. This view actually looks through the manifolding which supplies the molten solder to all the vias 60. The actual cross sectional thickness is shown in FIG. 5, which is a side view of the same solder head. A linear array of these micro holes covers the entire width of the cavity area of the mold plate. At a level above the hole array there is a continuous solder supply available in a reservoir that is either pressurized to initiate the solder feed, or not pressurized to contain the solder within the head even when lifted. A detail of the via array 60 in FIG. 3 is enlarged and shown in FIG. 4.

Figure 4:
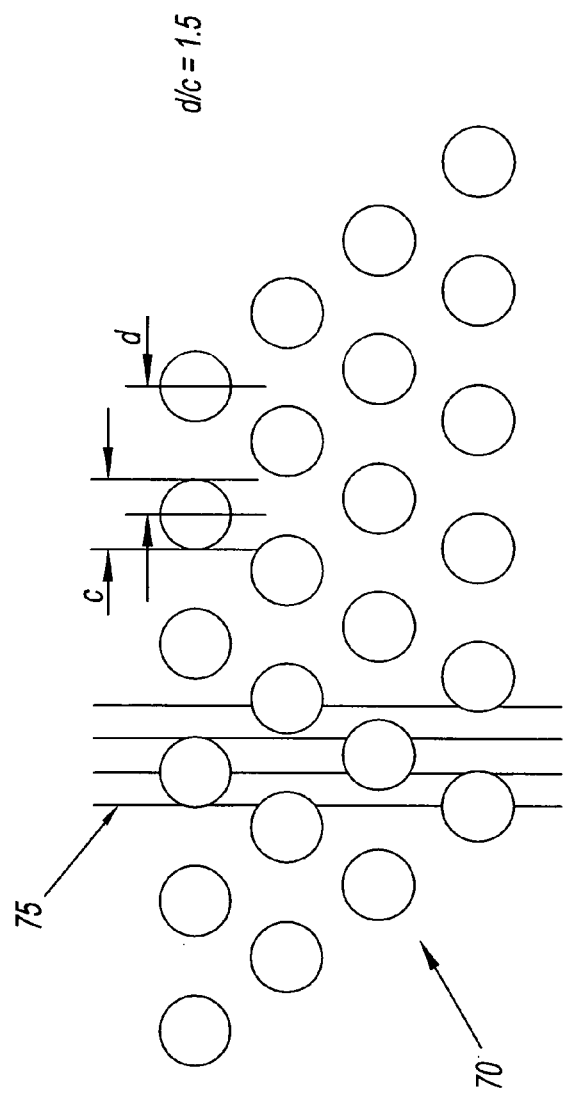
FIG. 4 shows a detail of the hole array.
Figure 5:
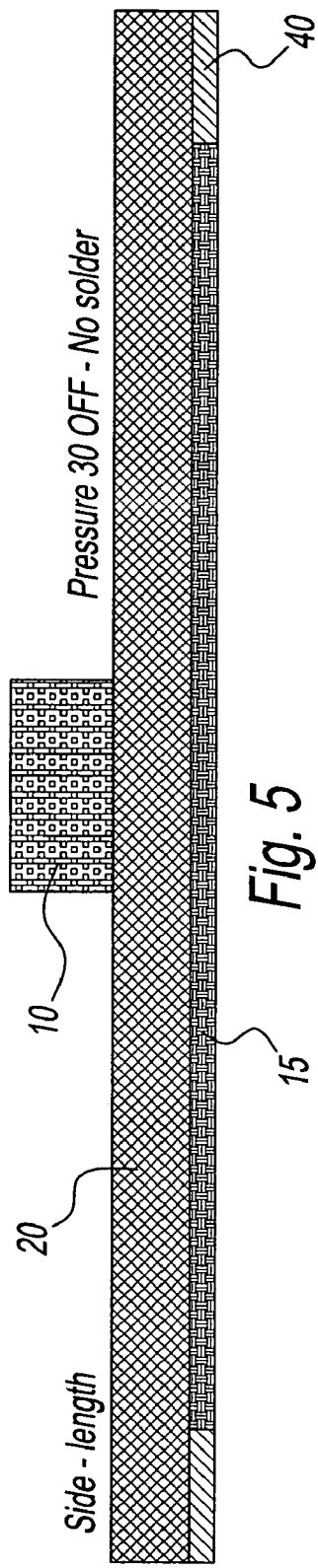
FIG. 5 is a side-width view of the C4NP head lifted up with no positive reservoir pressure applied.

Referring to FIG. 4, the details of the hole array are such that along length L, the hole configuration provides the same fill characteristic as if there were a continual slot. The four vertical lines represent cavity rows 75. Thus, each row of cavities intersects at least two fill micro holes thus assuring good fill of all cavities in the mold. To assure such a configuration, the pitch "d" to hole diameter "c" is 1.5 or less. This ratio can be smaller, but as it goes below 1 the strength of the material is adversely affected since less and less supporting material is left.

Of course, additional rows can be added, but such redundancy is usually not required. Accordingly, FIG. 4 shows that although this head is using an array of overlapping vias 60, the net effect of the placement of each individual via is the same as a continual slot covering the length covered by the array. Typically, the via holes 70 are equal to or less than the diameter of the cavities that need to be filled in the mold plate (not shown). The relationship of via diameter "c" to via pitch "d" for each row is also shown in FIG. 4, wherein d/c=1.5.

Sequential rows are staggered so that with 4 rows, all mold cavities will intersect at least two via holes. This provides a minimum redundancy, above which no functional advantages are gained. Of course, this cavity fill application is just one of many. The focus of this invention is the pressure-only valving achieved within the molten metal head itself.

Referring to FIG. 5, the C4NP head lifted up with no positive reservoir pressure applied is shown. As can be seen, although the solder is close to the bottom of the head, it does not leak out. Thus, filled molds can be removed from the scan area and new molds supplied while the head is lifted without solder spillage. Also, the solder remains molten and thus the head is ready to fill a new mold without the need to re-melt the solder.

FIG. 5 is focused on the valving aspects. Molten metal (solder in this case) reservoir 10 is shown connected to solder head 20 in this side view. There is manifolding (not shown) in the upper layer of solder head 20 that distributes the molten solder from the centrally located reservoir 10 to the entire length of the head 20. At the bottom level of the solder head 20, a side view of the micro-hole feed plate 40 can be seen. In this figure, the gas pressure 30 is closed (OFF) and thus the molten solder 15 remains within the solder head 20.

Figure 6:
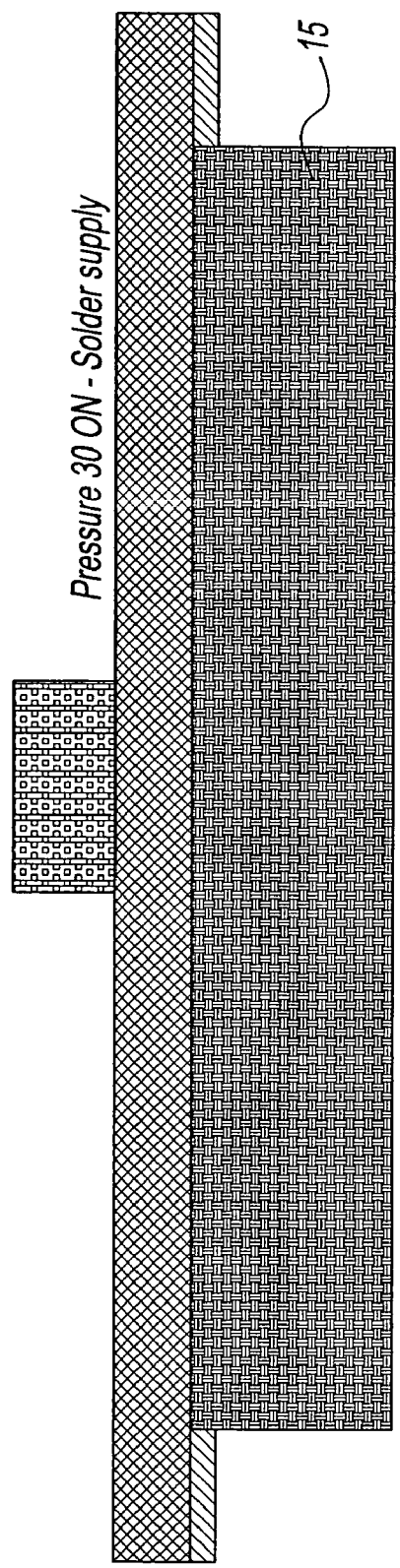
FIG. 6 is a side-width view that when the head reservoir is pressurized while the head is lifted, a continuous "curtain" of solder flows along the length of the micro hole array.

Referring to FIG. 6, the same view as FIG. 5 is shown, but now the gas pressure 30 has been opened (ON). This pressurizes the entire molten solder supply, from the reservoir downward through the manifolding and to the via holes. Since the pressure overcomes the resistance of the molten solder from entering the vias based on the aforementioned surface tension property of the solder, the solder now penetrates the high aspect ratio via holes and produces a "curtain" of molten solder 15 that flows until the gas pressure 30 is once again closed.

FIG. 6 shows what happens when the head reservoir is pressurized while the head is lifted. A continuous "curtain" of solder flows along the length of the micro hole array. Thus, it could be clearly seen that when the head is in contact with a scanning mold plate, the present continuous solder stream would readily fill all the cavities.

Thus, the present invention provides a method of dispensing molten solder into cavities of a substrate.

The method includes the steps of:

introducing a solder into a reservoir connected to a micro-hole feed solder head for holding solder, wherein the micro-holes have a diameter from about 10 microns to about 100 microns and an aspect ratio of at least about 2;

heating the reservoir to produce a molten solder;

providing a gas under pressure through a valve with an "on" and an "off" setting into the reservoir to feed the molten solder under pressure into the micro-hole feed solder head having a micro-hole feed plate containing an array of small holes to supply the solder there through into the cavities of the substrate;

moving the valve to the "on" setting to pressurize the gas in the solder head; and thereafter moving the valve to the "off" setting to not pressurize the gas in the solder head;

such that when the valve setting is "on," gas pressure is applied, the molten solder in the reservoir is pushed towards the micro-hole feed plate at the bottom of the solder head thereby dispensing molten solder onto the substrate.

At the outset, the valve is in the "off" setting, and the solder head is at atmospheric pressure. The continuous solder supply available in the reservoir is either pressurized to initiate the solder feed, or not pressurized to contain the solder within the head when lifted such that the cavities are filled with molten alloy without leaking the alloy.

Thus, in the method of the present invention, a pressure of at least about 1 psi is the sole valving initiator. Preferably, the pressure is from about 1 to about 20 psi.

From the above detailed description, it is clear how a functional pressure-only molten metal valving method is produced. Although the main application provided here is that of a molten solder supply used to fill mold plate cavities, this is only one of many applications that are possible for this novel method. Many liquids, from high temperature molten metals to room temp high purity liquids can be controlled in this fashion.

The above novel "Pressure-Only Molten Metal Valving Method" shows the ability to both lift the head containing molten solder as well as fill mold plates with solder as is required for a C4NP manufacturing fill tool.

The present invention has been described with particular reference to the preferred embodiments. It should be understood that variations and modifications thereof can be devised by those skilled in the art without departing from the spirit and scope of the present invention. Accordingly, the present invention embraces all such alternatives, modifications and variations that fall within the scope of the appended claims.

What is claimed is:

1. An apparatus for dispensing a molten solder into cavities of a substrate, comprising:

a micro-hole feed solder head having a micro-hole feed plate at the bottom of said solder head containing an array of small holes through which solder is supplied under pressure into cavities in a substrate;

a solder reservoir connected to said micro-hole feed solder head for holding said solder, wherein said micro-holes have a diameter from about 10 microns to about 100 microns and an aspect ratio of at least about 2;

means for heating said reservoir for maintaining said solder in a molten state; and means for supplying said solder from said reservoir to said micro-hole feed plate through a manifold structure in said micro-hole solder head; and means for supplying a gas at pressure to said solder head such that when said gas pressure is applied, the molten solder in said reservoir is pushed towards the micro-hole feed plate at the bottom of said solder head through said manifold structure thereby dispensing molten solder into cavities of said substrate.

2. The apparatus of claim 1, wherein said array has a hole configuration with the same fill characteristic as if said array of small holes were a continual slot, and wherein said array of small holes has one or more rows of holes having a pitch to hole diameter of 1.5 or less.

3. The apparatus of claim 1, wherein said substrate is an electronic substrate.

4. The apparatus of claim 1, wherein said substrate scans under the solder feed holes in a smooth motion to align successive rows of empty cavities to be filled with molten solder.

5. The apparatus of claim 4, wherein a continuous solder supply available in a reservoir is either pressurized to initiate the solder feed, or not pressurized to contain the solder within the head when lifted.

6. The apparatus of claim 5, wherein said molten metal head containing molten solder is lifted and said cavities are filled with molten solder without leaking the solder.

7. The apparatus of claim 1, wherein said micro-hole feed plate is affixed against the substrate.

8. The apparatus of claim 1, wherein said micro holes are contained in a material that has inherent low friction properties.

9. The apparatus of claim 1, wherein a pressure of at least about 1 psi is a sole valving initiator.

10. A method of dispensing a molten alloy into cavities of a substrate, said method comprising the steps of:

introducing an alloy into a reservoir connected to a micro-hole feed head for holding molten alloy, wherein said micro-holes have a diameter from about 10 microns to about 100 microns and an aspect ratio of at least about 2;

heating said reservoir to produce a molten alloy;

providing a gas under pressure through a valve with an "on" and an "off" setting into said reservoir to feed said molten alloy under pressure into said micro-hole feed head having a micro-hole feed plate containing an array of small holes to supply said molten alloy therethrough into said cavities of said substrate;

moving said valve to the "on" setting to pressurize said gas in said micro-hole feed head; and thereafter moving said valve to the "off" setting to not pressurize said gas in said micro-hole feed head;

such that when said valve setting is "on," gas pressure is applied, the molten alloy in said reservoir is pushed towards the micro-hole feed plate at the bottom of said micro-hole feed head thereby dispensing molten alloy onto said substrate.

11. The method of claim 10, wherein when said valve is in the "off" setting, said micro-hole feed head is at atmospheric pressure.

12. The method of claim 10, wherein said substrate is an electronic substrate.

13. The method of claim 10, wherein said substrate scans under the micro-hole feed plate holes in a smooth motion to align successive rows of empty cavities to be filled with molten alloy.

14. The method of claim 13, wherein a continuous molten alloy supply available in a reservoir is either pressurized to initiate the molten alloy feed, or not pressurized to contain the molten alloy within the head when lifted.

15. The method of claim 14, wherein said cavities are filled with molten alloy without leaking the alloy.

16. The method of claim 10, wherein said micro-hole feed plate is affixed against the substrate.

17. The method of claim 10, wherein said micro holes are contained in a material that has inherent low friction properties.

18. The method of claim 10, wherein a pressure of at least about 1 psi is the sole valving initiator.

19. An apparatus for dispensing molten alloy into cavities of a substrate, comprising:

a micro-hole feed head having a micro-hole feed plate at the bottom of said micro-hole feed head containing an array of small holes through which molten alloy is supplied under pressure into cavities in a substrate;

a reservoir connected to said micro-hole feed head for holding said molten alloy, wherein said micro-holes have a diameter from about 10 microns to about 100 microns and an aspect ratio of at least about 2;

a heating device to heat said reservoir for maintaining said alloy in a molten state; and an alloy supplying device to supply said molten alloy from said reservoir to said micro-hole feed plate through a manifold structure in said micro-hole feed head; and a gas supplying device to supply a gas at pressure to said micro-hole feed head such that when said gas pressure is applied, the molten alloy in said reservoir is pushed towards the micro-hole feed plate at the bottom of said micro-hole feed head through said manifold structure thereby dispensing molten alloy into cavities of said substrate.

20. A method of dispensing a molten solder into cavities of a substrate, said method comprising the steps of:

introducing a solder into a reservoir connected to a micro-hole feed solder head for holding solder, wherein said micro-holes have a diameter from about 10 microns to about 100 microns and an aspect ratio of at least about 2;

heating said reservoir to produce a molten solder;

providing a gas under pressure through a valve with an "on" and an "off" setting into said reservoir to feed said molten solder under pressure into said micro-hole feed solder head having a micro-hole feed plate containing an array of small holes to supply said solder there through into said cavities of said substrate;

affixing said micro-hole feed plate against the substrate;

moving said valve to said "on" setting to pressurize the gas in said solder head; and thereafter moving said valve to said "off" setting to not pressurize the gas in said solder head;

such that when said valve setting is "on," gas pressure is applied, said molten solder in said reservoir is pushed towards said micro-hole feed plate at the bottom of said solder head thereby dispensing molten solder onto the substrate.

* * * * *